US008602569B2

(12) United States Patent
Schmierer et al.

(10) Patent No.: US 8,602,569 B2
(45) Date of Patent: Dec. 10, 2013

(54) EXTERIOR REAR VIEW MIRROR WITH AN ELECTRICAL CONNECTION TO AN ELECTRICAL COMPONENT HOUSED IN THE EXTERIOR REAR VIEW MIRROR HOUSING

(75) Inventors: Arne Schmierer, Kirchheim (DE); Raimund Negel, Unterensingen (DE); Andreas Herrmann, Winnenden-Baach (DE); Istvan Szmolenszki, Schwaikheim (DE)

(73) Assignee: SMR Patents S.a.r.l., Luxembourg (LU)

( * ) Notice: Subject to any disclaimer, the term of this patent is extended or adjusted under 35 U.S.C. 154(b) by 204 days.

(21) Appl. No.: 13/164,865

(22) Filed: Jun. 21, 2011

(65) Prior Publication Data

US 2011/0317296 A1    Dec. 29, 2011

(30) Foreign Application Priority Data

Jun. 28, 2010    (EP) .................................... 10167555

(51) Int. Cl.
*G02B 5/08* (2006.01)
*G02B 7/18* (2006.01)

(52) U.S. Cl.
USPC ........................................... 359/841; 359/844

(58) Field of Classification Search
USPC ........................................................ 359/844
See application file for complete search history.

(56) References Cited

U.S. PATENT DOCUMENTS 6,650,457 B2 * 11/2003 Busscher et al. .............. 359/265
2002/0171906 A1   11/2002 Busscher et al.

FOREIGN PATENT DOCUMENTS

| DE | 19601565 | 8/1996 |
| DE | 10006397 | 9/2001 |
| EP | 0644084 | 3/1995 |
| EP | 1197390 | 4/2002 |
| EP | 1717103 | 11/2006 |

OTHER PUBLICATIONS

European Search Report for application No. EP 10 16 7555 dated Nov. 10, 2010.

* cited by examiner

*Primary Examiner* — Jade R Chwasz
(74) *Attorney, Agent, or Firm* — Reising Ethington PC

(57) ABSTRACT

An exterior rear view mirror of a motor vehicle, which comprises an exterior rear view mirror housing and at least one electrical connection to at least one electrical component at least partly housed in the inside of the exterior rear view mirror housing. The electrical connection comprises at least one connection cable and at least one plug connection. The plug connection comprises a first plug part connected to the electrical component at least by means of one section of the at least one connection cable, and a second plug part assigned to the first plug part, fixed in the exterior rear view mirror housing.

8 Claims, 3 Drawing Sheets

EXTERIOR REAR VIEW MIRROR WITH AN ELECTRICAL CONNECTION TO AN ELECTRICAL COMPONENT HOUSED IN THE EXTERIOR REAR VIEW MIRROR HOUSING

The invention is based on a priority patent application EP 10167555.1 which is hereby incorporated by reference.

BACKGROUND ART

1. Field of the Invention

The invention relates to an exterior rear view mirror for a motor vehicle with an exterior rear view mirror housing and an electrical connection housed therein with the electrical connection comprising at least one connection cable and at least one plug connection, wherein the plug connection includes at least one first plug part connected to the electrical component by means of a portion of the at least one connection cable, and a second plug part associated to the first plug part, fixed in the exterior rear view mirror housing, and that the fixing is done by a clip connection between the exterior rear view mirror housing and the second plug part.

2. Description of the Related Art

An exterior rear view mirror assembly for a motor vehicle consists, for example, of a mirror base attached to the motor vehicle, which can be covered by a mirror base covering, and an exterior rear view mirror arranged on the mirror base. The mirror base can be produced, for example, from a die casting material resistant to the forces and moments which occur. The exterior rear view mirror includes an exterior rear view mirror housing, which, among others, houses the base bracket assigned to the mirror base.

The mirror base and the base bracket are hinged together, so that the exterior rear view mirror can be pivoted about a hinge axis towards the mirror base from an operating position to a folding point and vice versa. In this process, bearing means can be provided between the mirror base and the base bracket, in order to keep wear and tear and frictional forces arising during movement as low as possible.

Preferably, the base bracket is also produced from die-casting material which is resistant to the occurring forces and moments, for example, from the same material as the mirror base. An adjusting device for a mirror glass, driven by an electric motor, for example, is arranged on the mirror base. The adjusting device acts on a backing plate, on which the mirror glass is arranged. The mirror glass can be mounted onto the backing plate by means of an adhesive connection, for example. The backing plate can be guided to and/or mounted on the adjustment device and/or the base bracket. The term 'backing plate' here refers to a bracket, which comprises at least one bracket surface, with a plane or vaulted design, closed or in a non-continuous grid, for example, honeycombed, on which it is suitable to attach a mirror glass, for example by means of an adhesive connection or by clipping e.g. locking means, protruding behind the perimeter of the bracket surface and arcing inwards towards the centre of the bracket surface, seen from the perimeter.

On its rear side, facing away from the direction of movement of the motor vehicle in the operating position, the exterior rear view mirror housing comprises an opening, through which the mirror glass is visible, or in which the mirror glass is arranged. In order to ensure that the mirror glass is adjustable, a distance is kept on all sides between the mirror glass or backing plate and the walls of the exterior rear view mirror housing surrounding the opening, so that a gap is given around the mirror glass between the walls of the exterior rear view mirror housing surrounding the opening.

Alternatively or additionally to an adjustment device for mirror glass, driven by a motor, the exterior rear view mirror can comprise at least one further electrical component, such as a turn signal indicator, a heated mirror glass, an electrochromatically dimmable mirror glass, a recording and/or warning display module for a driving assistance device, such as blind spot monitoring, a lane departure warning, approach monitoring, or similar, or a combination thereof. Alternatively or additionally, the exterior rear view mirror can also comprise sensors for recording driving and/or surrounding conditions, such as for example, temperature, brightness, degree of pollution, lighting situation, for example, in order to automatically heat the mirror glass, or to dim electrochromatically, for example.

A known object in the development and production of motor vehicle parts, such as perhaps an exterior rear view mirror assembly or an exterior rear view mirror, is a simple, time-saving assembly.

This object is often not achieved in electrical connections to electrical components, which are at least partly housed in the exterior rear view mirror housing, to be made inside the exterior rear view mirror housing, associated with the disadvantage of a high expenditure of time in assembly, as well as in replacing damaged or faulty electrical components of the exterior rear view mirror, for example, in motor vehicle maintenance.

Above all, this disadvantage occurs in electrical connections, which have at least one connection cable provided with a plug connection, such as perhaps a connection cable which is separable by the plug connection. Electrical connections of this type are required, for example, in order to produce a freely moveable electrical connection inside of the exterior rear view mirror housing. A freely moveable electrical connection of this type can be provided, for example, for electrical components which are adjustable in relation to the exterior rear view mirror housing, for example, a heatable and/or electrochromatically dimmable mirror glass, on the condition that the freely moveable part of the electric connection is measured so that, in principle, the adjustability of the electrical components is not limited.

Electrical wiring in an exterior mirror is known in U.S. Pat. No. 6,650,457 B2. The different electrical components are connected to the main plug connector 28, 28B by plug connectors and adapters. The relative position of the plug connector in the housing is thus determined by the electrical components, which should be provided. Thus, one plug connector is provided for the glass heating, one for the indicator etc. whereby the plug connectors are not attached.

SUMMARY OF THE INVENTION

One object of the invention is to develop an improved exterior rear view mirror for a motor vehicle, which exterior rear view mirror comprises an exterior rear view mirror housing and at least one electrical connection housed therein, with at least one connection cable provided with a plug connection to at least one electrical component at least partly housed in the exterior rear view mirror, which electrical connection permits a simple assembly and a simple exchange of at least one electrical component of the exterior rear view mirror with a low time expenditure.

The object is achieved by an exterior rear view mirror for a motor vehicle, with an exterior rear view mirror housing, and at least one electrical connection to at least one electrical component at least partly housed inside of the exterior rear view mirror housing, with the electrical connection comprising at least one connection cable and at least one plug connection, wherein the plug connection includes at least one first plug part connected to the electrical component by means of a portion of the at least one connection cable, and a second plug part associated to the first plug part, fixed in the exterior rear view mirror housing, and that the fixing is done by a clip connection between the exterior rear view mirror housing and the second plug part.

Accordingly, an exterior rear view mirror is provided for a motor vehicle, which exterior rear view mirror comprises an exterior rear view mirror housing and at least one electrical component at least partly housed inside the exterior rear view mirror housing, as well as an electrical connection to the electrical component housed in the exterior rear view mirror housing. The electrical connection comprises at least one connection cable and at least one plug connection, perhaps one connection cable provided with a plug connection, and separable with this, for example. The plug connection includes a first plug part attached to the electrical component at least by means of a section of the at least one connection cable, and a second plug part assigned to the first plug part, fixed in the exterior rear view mirror housing and electrically connected, for example, via the mirror base and via the hinge connection between the base bracket and the mirror base.

The plug connection is fixed by the second plug part fixed on the exterior rear view mirror housing, and is therefore immobile on the exterior rear view mirror housing, and cannot move freely between two sections of the at least one connection cable. A possibly required freely moveable part of the electrical connection is exclusively formed by the section of the connection cable provided for connecting the first plug part to the electrical component.

Amongst others, advantages of the invention in comparison with the prior art result from the electrical connection being produced with one hand by a nesting engagement of the first and second plug part, and can also be disconnected with one hand by pulling the first plug part out of the second plug part. The assembly and replacement of an electrical component, which is provided for an electrical connection of this type, is made significantly easier by this, since the electrical component can be held with one hand, and the electrical connection can be made or disconnected with the other hand. The fixing of the second plug part almost forms a 'third hand', which facilitates the creation or disconnection of the plug connection by inserting or removing the first plug part into or from the second plug part with only hand. Due to the section of the connection cable remaining between the plug connection and the electrical component, the electrical connection is still freely moveable, if required, so that it is also suitable for electrical contacting relating to the electrical components which are adjustable in relation to the exterior rear view mirror housing, without essentially limiting their adjustability in relation to the exterior rear view mirror housing.

Furthermore, due to the section of the connection cable remaining between the plug connection and the electrical component, with the second plug part of the plug connection fixed on the exterior rear view mirror housing at the same time, the exterior rear view mirror allows for simple assembly and a simple exchange of at least one electrical component of the exterior rear view mirror with a low time expenditure.

The fixing can be produced, for example, by a detachable clip connection between the exterior rear view mirror housing and the second plug part on the housing side. In principle, a bolted connection is possible between the second plug part and the exterior rear view mirror housing for fixing the second plug part of the plug connection to the exterior rear view mirror housing. Additionally, the second plug part can be integrated into the exterior rear view mirror housing by injection moulding.

A further, second plug connection can be provided for connecting the section of the connection cable linked to the first plug part to the electrical component. Accordingly, the section of the connection cable can be connected to the electrical component by the second plug connection. In this process, first of all, there is the option of producing either the first or second plug connection, according to the installation position of the electrical component, and depending on whether the first plug connection between the connection cable and the first plug part or the second plug connection between the connection cable and the electrical component is more easily accessible immediately before the installation.

The connection cable can be a single core or multi-core, whereby in the case of a multi-core cable, the plug connection preferably comprises plug parts, which include corresponding contact means for all wires of the connection cable.

The corresponding contact means of the first and second plug parts, designed as contact pins and contact sleeves, for example, can give a plug-in direction, along which a relative motion is required between the first and second plug part, for the creation or disconnection of the plug connection. Seen from the second plug part fixed in the exterior rear view mirror housing, the orientation of the plug connection, corresponding to the plug-in direction, is preferably towards the electrical component, and particularly preferably, towards the opening for the mirror glass provided on the rear side of the exterior rear view mirror housing.

The position of the second plug part in the exterior rear view mirror housing, for example, in the above-described orientation of the plug-in direction of the plug connection, is preferably chosen so that, seen from the opening, with the mirror glass removed, or with the backing plate holding the mirror glass removed, there is no covering at all of the plug connection to the base bracket or another component, such as perhaps an electrical component, housed in the exterior rear view mirror housing. Accordingly, seen from the opening, with the backing plate holding the mirror glass removed, it is intended that the second plug part is accessible without being covered by other components housed in the exterior rear view mirror housing.

If, for example, the electrical component concerns a heatable and/or electrochromatically dimmable mirror glass arranged on the backing plate, and serves for the electrical connection of the heating and/or control of the electrochromatic dimming of the mirror glass, the first plug part on the component side is preferably arranged with its side, which accepts or receives the second plug part on the housing side, facing towards the opening on the rear side of the exterior rear view mirror housing. In the described position and orientation with the mirror glass removed, the plug connection of the electrical connection can be easily reached and produced, or disconnected, if required. By fixing the first plug part in the exterior rear view mirror housing, a one-handed and therefore simple assembly is also possible, since the second plug part can be simply inserted into the first plug part or pulled out of this.

The first and/or second plug part can be provided with a seal to prevent moisture and/or dirt, for example, entering the plug connection.

For example, in order to facilitate an assembly of the different components at least partly housed in the exterior rear view mirror housing, as well as, if necessary, their electrical connections between each other and/or with a control unit housed on the motor vehicle side in a rear view mirror of this type, the exterior rear view mirror housing can be designed in at least two parts. A first housing part forms the housing base, for example, and a second housing part forms the housing cover. At the same time, one of both housing parts can include the housing section lying around the opening for the mirror glass, with the walls surrounding the opening.

As an additional or alternative electrical component, the exterior rear view mirror housing can house a turn signal indicator and/or a module and/or a sensor of a driving assistance device and/or a module and/or a sensor for controlling a vehicle function, such as, for example, control of the heating and/or automatic dimming of the mirror glass. The module and/or sensor for a driving assistance device can here concern, for example, a display device for a blind spot monitoring, a lane departure warning or a proximity monitoring, a receiver for satellite-based positioning or similar, or a combination thereof. The module and/or sensor for controlling a vehicle function can here concern a temperature sensor and/or a brightness sensor.

The electrical connection with a plug connection and a connection cable can also be provided for electrical components, which, for example, are installed by insertion into the exterior rear view mirror housing, whereby the electrical connection is made before insertion, in that the first connection part is connected to the second connection part.

It is important to emphasise that the terms first and second plug part, first and second housing part, as well as the terms first and second in general, do not denote a sequence or concrete instructions for arrangement, but rather merely serve for differentiation, and are exchangeable in any way.

Further features of the invention result from the claims, description and the drawings.

BRIEF DESCRIPTION OF THE DRAWINGS

Advantages of the invention will be readily appreciated as the same becomes better understood by reference to the following detailed description when considered in connection with the accompanying drawings, wherein.

Embodiments of the invention are subsequently explained in more detail by means of the drawings. Identical reference characters denote identical or identically acting elements therein. Schematically represented in the drawings.

DETAILED DESCRIPTION OF THE PREFERRED EMBODIMENT

Figure 1:
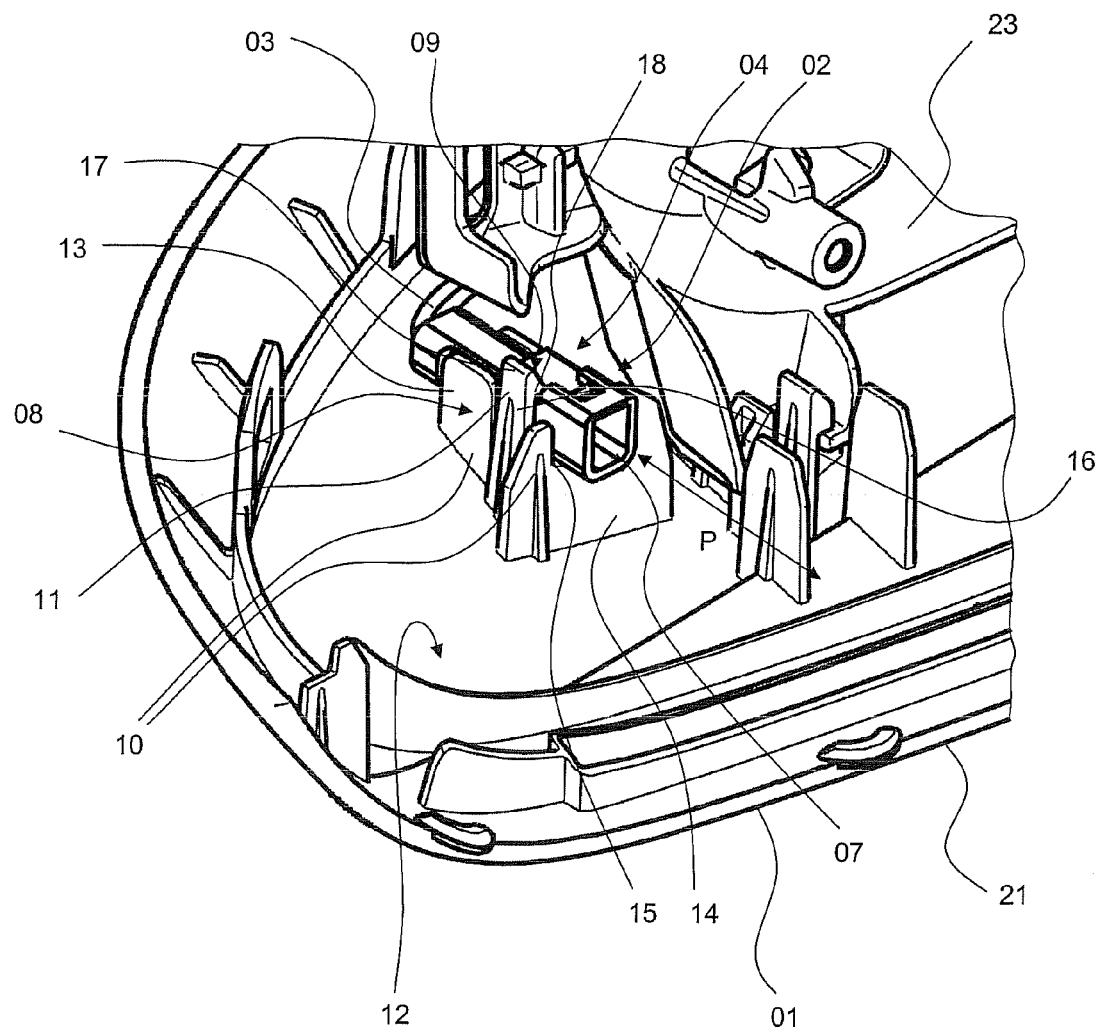
FIG. 1 is a detailed view of a second plug part, fixed in an exterior rear view mirror housing, of a plug connection of an electrical connection to an electrochromatically dimmable mirror glass housed in the exterior rear view mirror housing, from a perspective view.
Figure 2:
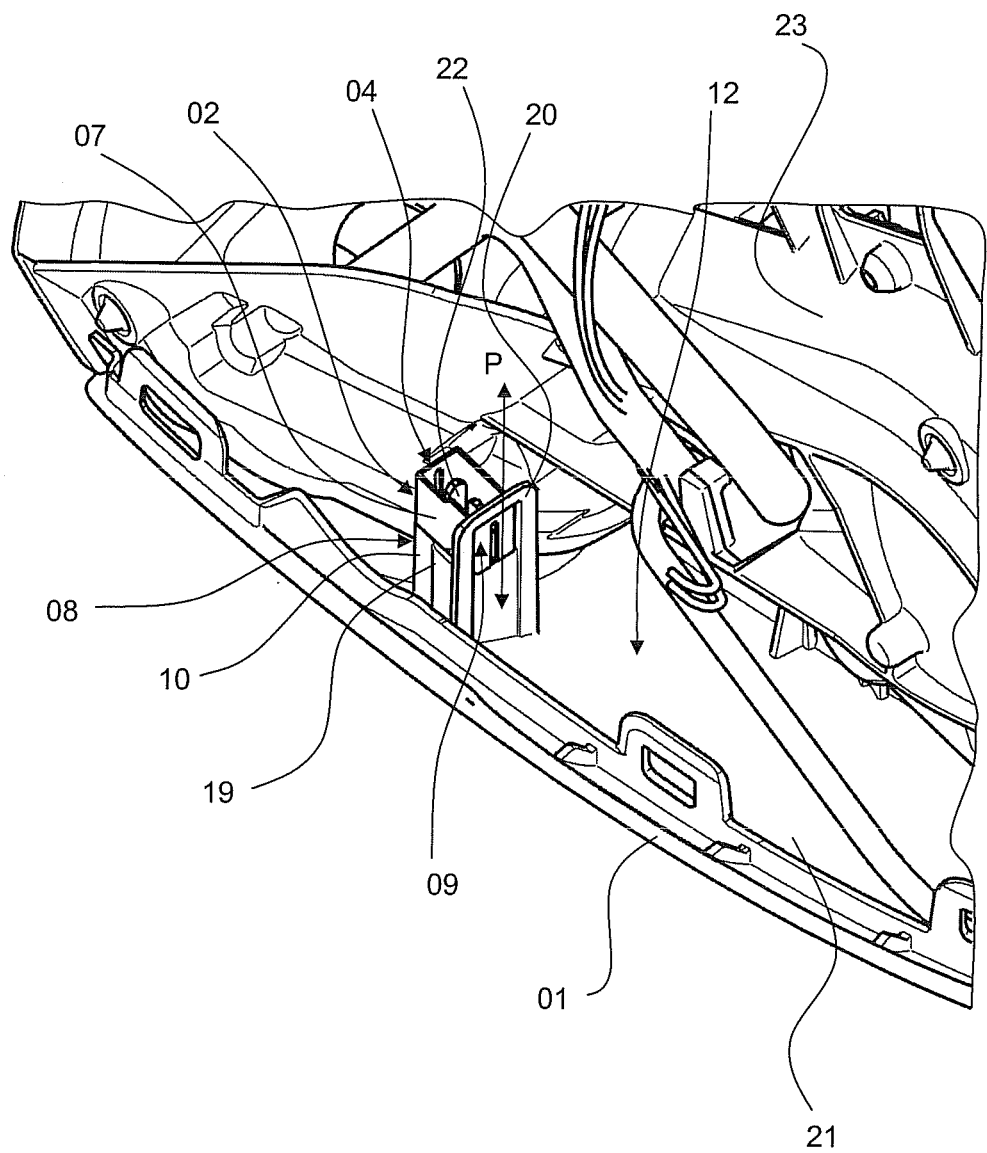
FIG. 2 is a detailed view of a second plug part, fixed in an exterior rear view mirror housing, of a plug connection of an electrical connection to an electromotive adjusting device for a mirror glass housed in the exterior rear view mirror housing, from a perspective view.
Figure 3:
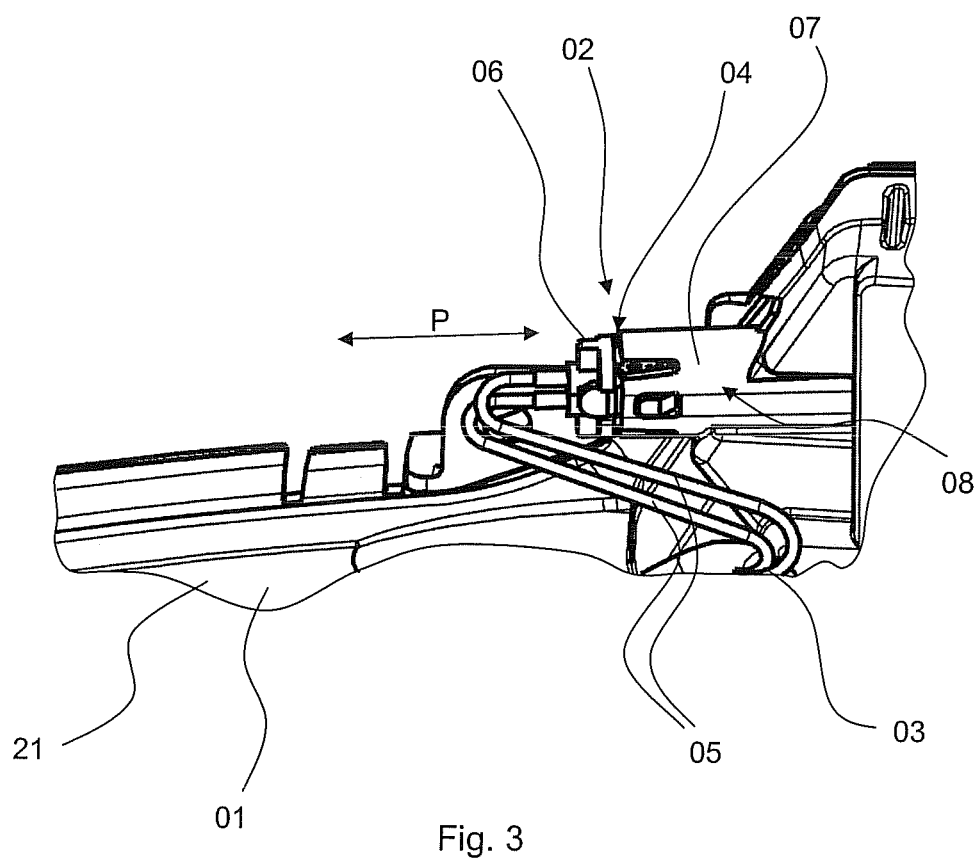
FIG. 3 is a detailed view of a second plug part, fixed in an exterior rear view mirror housing, of a plug connection of an electrical connection to a turn signal indicator at least partly housed in the exterior rear view mirror housing, from a perspective view.

An exterior rear view mirror, partly shown in FIGS. 1 to 3, for a motor vehicle, comprises an exterior rear view mirror housing 01 and at least one electrical connection 02 to at least one electrical component at least partly housed in the inside of the exterior rear view mirror housing 01. The electrical connection comprises at least one connection cable 03 and at least one plug connection 04. The plug connection 04 comprises a first plug part 06 connected to the electrical component, not shown, by means of at least one section 05, shown in FIG. 3, of the at least one connection cable 04, and a second plug part 07, assigned to the first plug part 06, fixed in the exterior rear view mirror housing 01.

The fixing 08 of the second plug part 07 in the exterior rear view mirror housing 01 can be produced in many ways, as can be seen in FIGS. 1 to 3.

A first option is a detachable clip connection 09, shown in FIGS. 1 and 2 as a fixing 08 between the exterior rear view mirror housing 01 and second plug part 07.

The clip connection 09 in FIG. 1 includes a slot 10 for the second plug part 07, and at least one latch 11 engaging behind the second plug part 07. The slot 10 can be formed by two or several bars 13, 14, running longitudinally and transverse to the second plug part 07, for example, arranged on an inner wall 12 of the exterior rear view mirror housing 01. At least one of the bars 14 can comprise a section 15, which corresponds in cross-section with a contour of the second plug part 07. The cross-section thus lies in a plane formed by the corresponding bar 14. Between or next to the bars 13, 14, the at least one latch 11 can be arranged on the inner wall 12 of the exterior rear view mirror 01. The latch 11 consists of a rigid swing arm or locking spring 16, which is attached by a first end to the inner wall 12 of the exterior rear view mirror housing 01. The second, free end 17 of the locking spring 16 extends freely from the inner wall into the interior space surrounded by the exterior rear view mirror housing 01. The free end 17 is spring-elastically moveable transversely to the second plug part 07. A locking projection 18 protruding towards the second plug part 07 is arranged on the free end 17. The length of the locking spring 16 is measured so that the locking projection 18, seen from the first end of the locking spring 16 attached to the inner wall 12 of the exterior rear view mirror housing 01, engages behind the second plug part 07 which is absorbed into the slot 10. The bars 13, 14 as well as the latch 11 can be produced as integral components of the exterior rear view mirror housing 01, for example, in an injection moulding process.

The clip connection 09 in FIG. 2 also includes a slot 10, which, however, is designed as a receiving shaft 19, which surrounds the second plug part 07 at the rear. The receiving shaft 19 is also arranged on the inner wall 12 of the exterior rear view mirror housing 01. The receiving shaft 19 can also be overmoulded to an inner wall 12 as an integral component of the exterior rear view mirror housing 01. For the clip connection 09 in FIG. 2, a locking feature 20 is provided, which overlaps the front part of the second plug part 07, after the insertion of the rear part of the second plug part 07 into the receiving shaft 19.

In FIG. 3, the fixing 08 is produced by the second plug part 07 being overmoulded as an integral component on the inner wall 12 of the exterior rear view mirror housing 01.

The exterior rear view mirror housing 01 can be designed in at least two parts. The exterior rear view mirror housing 01 consists in this case of at least a first housing part 21 and a second housing part not shown in FIGS. 1 to 3. The exterior rear view mirror housing 01 comprises an opening for a mirror glass on the rear side, facing away from the direction of movement of the motor vehicle. One of both housing parts comprises a housing section lying around the opening for the mirror glass, with the walls surrounding the opening. For example, the second housing part includes the housing section lying around the opening for the mirror glass. The first housing part 21 can form or contain a housing base, whereas the second housing part can form or contain a housing cover. Due to the two-part design of the exterior rear view mirror housing 01, the assembly of the exterior rear view mirror is made substantially easier by improved accessibility of individual component parts, electrical components and electrical connections.

For a two or multi-part exterior rear view mirror housing 01, the second plug part 07 of the plug connection 04 is preferably fixed in the first housing part 21, which is free from the housing section, with the walls surrounding the opening.

The orientation of a plug-in direction, indicated by the double arrow P, of the plug connection 04 is preferably towards the electrical component, seen from the second plug part 07 fixed in the exterior rear view mirror housing 01 (FIG. 1, FIG. 2, FIG. 3). In the direction of the plug-in direction, indicated by the double arrow P, the first plug part 06 must be pushed into or pulled out of the second plug part 07, in order to create or break the plug connection 04. The plug-in direction, indicated by the double arrow P, is given, for example, by the form and shape of the corresponding first and second plug parts 06, 07, which face each other, of the plug connection 04. If, for example, the contact means given in the plug parts 06, 07 for electrical contact are designed as contact pins 22 (FIG. 2) and contact sleeves, the plug-in direction indicated by the double arrow P matches the longitudinal extension of the contact pins 22. The fixing 08 of the second plug part 07 in the exterior rear view mirror housing 01 takes into account the orientation of the plug-in direction, indicated by the double arrow P, of the plug connection 04.

Particularly preferably, the orientation of a plug-in direction, shown by the double arrow P, of the plug connection 04 is towards the opening for the mirror glass provided on the rear side of the exterior rear view mirror housing 01 (FIG. 1).

If the electrical component is, for example, a heatable and/or electrochromatically dimmable mirror glass arranged on a backing plate, and serves for the electrical connection 02 of the heating and/or control of the electrochromatic dimming of the mirror glass, so the first plug part 06 on the component side is preferably oriented with its side, which accepts or receives the second part 07 on the housing side, facing towards the opening on the rear side of the exterior rear view mirror housing (FIG. 1).

In addition to the orientation of the plug connection 04, the position of the second plug part 07 in the exterior rear view mirror housing 01 can be chosen so that the plug connection 04, seen from the electrical component connected by means of the accompanying electrical connection 02, is accessible without a covering by other components housed in the exterior rear view mirror housing 01 (FIG. 1, FIG. 2, FIG. 3).

The position of the second plug part 07 in the exterior rear view mirror housing 01, for example, in the above described orientation of the plug-in direction, indicated by the double arrow P, of the plug connection 04 and the previously described position is accordingly chosen so that, seen from the electrical component, with the electrical component removed or before assembly of the electrical component, there is no covering of the plug connection 04 by a base bracket 23 or another component, such as an electrical component, housed in the exterior rear view mirror housing 01 (FIG. 1, FIG. 2, FIG. 3).

In a particularly preferable embodiment, the position of the second plug part 07 in the exterior rear view mirror 01 is chosen so that plug connection 04, seen from the opening provided on the rear side of the exterior rear view mirror housing 01 for the mirror glass, with the backing plate holding the mirror glass removed, is accessible without a covering by other components housed in the exterior rear view mirror housing 01 (FIG. 1).

The position of the second plug part 07 in the exterior rear view mirror housing 01, for example, in the above-described orientation of the plug-in direction, indicated by the double arrow P, of the plug connection 04 and the previously described position is accordingly chosen so that, seen from the opening with the mirror glass removed or with the backing plate holding the glass removed, there is no covering at all of the plug connection 04 by a base bracket 23 or another component, such as an electrical component, housed in the exterior rear view mirror housing 01 (FIG. 1).

Alternatively or additionally to an electrical component designed as a heatable and/or electrochromatically dimmable mirror glass, at least partly housed in the exterior rear view mirror housing 01, further electrical components can be at least partly housed in the exterior rear view mirror housing 01. This electrical component can be a turn signal indicator and/or a module and/or a sensor of a driving assistance device and/or a module and/or a sensor for control of a vehicle function, such as, for example, for control of the heating and/or automatic dimming of the mirror glass.

It is important to emphasise that at least the section 05 of the connection cable 03 connected to the electrical component is moveable between the electrical component and the plug connection 04 in the interior space surrounded by the exterior rear view mirror housing. The electrical connection 02 thus represents a freely moveable electrical connection 02, which is necessary, for example, in order to connect an electrical component relatively moveable to the exterior rear view mirror housing 01. An example of a component of this type is the mirror glass arranged on the backing plate, which requires at least one freely moveable connection 02 for electrical connection of a mirror glass heater or an electrochromatic layer required for electrochromatic dimming, for example. A freely moveable electrical connection 02 of this type is characterized in that, in principle, it does not limit the adjustability of the mirror glass or, in general, of the relatively moveable electrical component in relation to the base bracket firmly mounted relative to the exterior rear view mirror housing 01.

A freely moveable electrical connection 02 is also suitable, for example, for electrical components which are installed by insertion into the exterior rear view mirror housing 01, whereby the electrical connection 02 is made before insertion, in that the first plug part 06 is connected to the second plug part 07.

The invention is particularly commercially applicable in the production of exterior rear view mirrors and exterior rear view mirror assemblies for motor vehicles.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

LIST OF REFERENCE CHARACTERS

01 Exterior rear view mirror housing
02 Electrical connection
03 Connection cable
04 Plug connection
05 Section
06 First plug part 07 Second plug part
08 Fixing
09 Clip connection
10 Slot
11 Latch
12 Inner wall
13 Bar
14 Bar
15 Section
16 Locking spring
17 Free end
18 Locking projection
19 Receiving shaft
20 Locking feature
21 First housing part
22 Contact pin
23 Base bracket
P Plug-in direction

We claim:

1. An exterior rear view mirror assembly for a motor vehicle, said exterior rear view mirror assembly comprising:
    an exterior rear view mirror housing defining an inner wall and an opening;
    a backing plate movably secured with said exterior rear view mirror housing;
    a mirror secured with said backing plate and visible through said opening;
    an electrical component at least partly housed inside said exterior rear view mirror housing, said electrical component having a connection cable;
    a plug connection including a first plug part electrically connected to said electrical component by a connection cable, said plug connection including a second plug part associated to the first plug part, wherein said second plug part is fixedly secured to said inner wall of said exterior rear view mirror housing; and
    a clip connection between said exterior rear view mirror housing and said second plug part to secure said second plug part to said exterior rear view mirror housing.

2. An exterior rear view mirror assembly according to claim 1, wherein said first plug part defines an orientation of a plug-in direction with respect to said second plug part as being toward said electrical component.

3. An exterior rear view mirror assembly according to claim 1, wherein said
    second plug part in the exterior rear view mirror housing is accessible independent of any other components housed in said exterior rear view mirror housing.

4. An exterior rear view mirror assembly according to claim 1, wherein said
    second plug part defines a position in said exterior rear view mirror housing such that said plug connection, seen from said opening for said mirror glass is positioned on a reverse side of said exterior rear view mirror housing, and when said backing plate holding said mirror glass is removed, said plug connection is accessible without being covered by other components housed in said exterior rear view mirror housing.

5. An exterior rear view mirror assembly according to claim 1, wherein
    at least one electrical component in the form of a heatable or electrochromatically dimmable mirror glass arranged on said backing plate, whereby the electrical connection is provided for heating and/or control of the electrochromatic dimming of the mirror glass.

6. An exterior rear view mirror assembly according to claim 1, wherein
    said first plug part and/or said second plug part are provided with a seal.

7. An exterior rear view mirror assembly according to claim 1, wherein said
    exterior rear view mirror housing includes a first housing part and a second housing part, whereby one of both of said first and second housing parts defines a housing section extending around said opening for said mirror, said housing section having walls surrounding said opening.

8. An exterior rear view mirror assembly according to claim 7, wherein said
    second plug part of said plug connection is fixed to said inner wall of said exterior rear view mirror housing free from said walls surrounding said opening.

* * * * *